May 26, 1959 B. HOUSMAN 2,888,201

ADDER CIRCUIT

Filed Dec. 31, 1957 2 Sheets-Sheet 1

INVENTOR.
BENNETT HOUSMAN

BY George Baron

ATTORNEY

| X | Y | $S_h$ | $C_h$ | $C_i$ | $S_f$ | $C_f$ |
|---|---|---|---|---|---|---|
| 0 | 0 | 0 | 0 | 0 | $0=S_h$ | $0=C_h$ |
| 0 | 1 | 1 | 0 | 0 | $1=S_h$ | $0=C_h$ |
| 1 | 0 | 1 | 0 | 0 | $1=S_h$ | $0=C_h$ |
| 1 | 1 | 0 | 1 | 0 | $0=S_h$ | $1=C_h$ |
| 0 | 0 | 0 | 0 | 1 | $1=\bar{S}_h$ | $0=C_h$ |
| 0 | 1 | 1 | 0 | 1 | $0=\bar{S}_h$ | $1=\bar{C}_h$ |
| 1 | 0 | 1 | 0 | 1 | $0=\bar{S}_h$ | $1=\bar{C}_h$ |
| 1 | 1 | 0 | 1 | 1 | $1=\bar{S}_h$ | $1=C_h$ |

United States Patent Office 2,888,201

Patented May 26, 1959

2,888,201

ADDER CIRCUIT

Bennett Housman, Arlington, Va., assignor to International Business Machines Corporation, New York, N.Y., a corporation of New York Application December 31, 1957, Serial No. 706,448

9 Claims. (Cl. 235—175)

This invention relates to adder circuits and more particularly to adder circuits employing low temperature components.

Materials which are known as superconductors are so termed because of the fact that, when cooled below particular temperatures in the vicinity of absolute zero, they undergo transitions whereby they become essentially perfect conductors, losing all measurable electrical resistance. The phenomenon of superconductivity is treated in detail in such texts as "Superconductivity" by D. Shoenberg, published in 1952 by the Cambridge University Press in London, England and "Superfluids" volume I, by Fritz London, published in 1950 by John Wiley and Sons, Inc. in New York, N.Y. The present invention relates to that aspect of superconductivity referred to as the phenomenon of "trapped flux" or a "frozen-in" field. Such phenomenon is discussed in the aforementioned texts as well as in a paper by J. J. Budnick et al. entitled "Trapped Flux in Impure Superconductive Tin" appearing in the July 15, 1956, issue of the "Physical Review," volume 103, No. 2, pages 286–291 and in a copending U.S. application for a "Multistable Circuit" by James W. Crowe et al., Serial No. 622,902, filed on November 19, 1956, and assigned to the assignee of the instant application. The trapped flux phenomenon has been observed in superconductor materials under certain conditions when the latter go from their superconductive states to their normal resistive states and back again to their superconductive states. When as a result of lowering its temperature a superconductive substance passes from its normal state to its superconducting state in the presence of an externally applied magnetic field, it becomes a perfect diamagnetic and excludes the applied field entirely except in a thin surface layer. Presumably, during the course of transition from the normal to the superconducting state, multiple connected parts within the substance may develop which have the general form of closed superconducting regions surrounding cores of normal metal. Such cores of normal state will have magnetic flux running through them. The perfect conductivity of the enclosing superconducting regions makes it impossible for this flux to change. The specimen retains a small magnetic moment proportional to the amount of flux trapped in this fashion even after the externally applied field has been reduced to zero. A persistent current in the thin surface layer of the superconductor exists around these cores of normal state so as to maintain the trapped flux. Such cores of normal state are believed to be caused by impurities in the superconductor substance. The effect of such impurities can be attained by actual holes or perforations made in the superconductive substance.

The aforementioned Crowe et al. application employs holes in a superconductive surface as a means for trapping flux, such flux being trapped in a first hole to indicate the storage of a binary "1," and means are provided to cause the trapped flux to be removed from said first hole and appear in a second hole, its appearance in said second hole representing the storage of a binary "0." By providing for each hole a drive winding that is capable of supplying a magnetic field that is sufficient to induce a circulating current in the superconductor which exceeds the critical current of the superconducting area between two holes, one may switch trapped flux from one hole to another hole. Such switching may be employed to create a flip-flop, as will be shown hereinafter, and such flip-flop will become a most useful component in a novel adder.

Consequently it is an object of the present invention to construct a novel adder employing superconductive elements.

A further object is to provide logic circuits utilizing superconductive elements, such logic circuits being particularly applicable to computers.

Yet another object is to provide logic circuits that are particularly adaptable to operation when subjected to temperatures close to absolute zero.

Other objects of the invention will be pointed out in the following description and claims and illustrated in the accompanying drawings which disclose, by way of example, the principle of the invention and the best mode which has been contemplated of applying that principle.

Figures 1, 2, 3, 4, 5, 6:
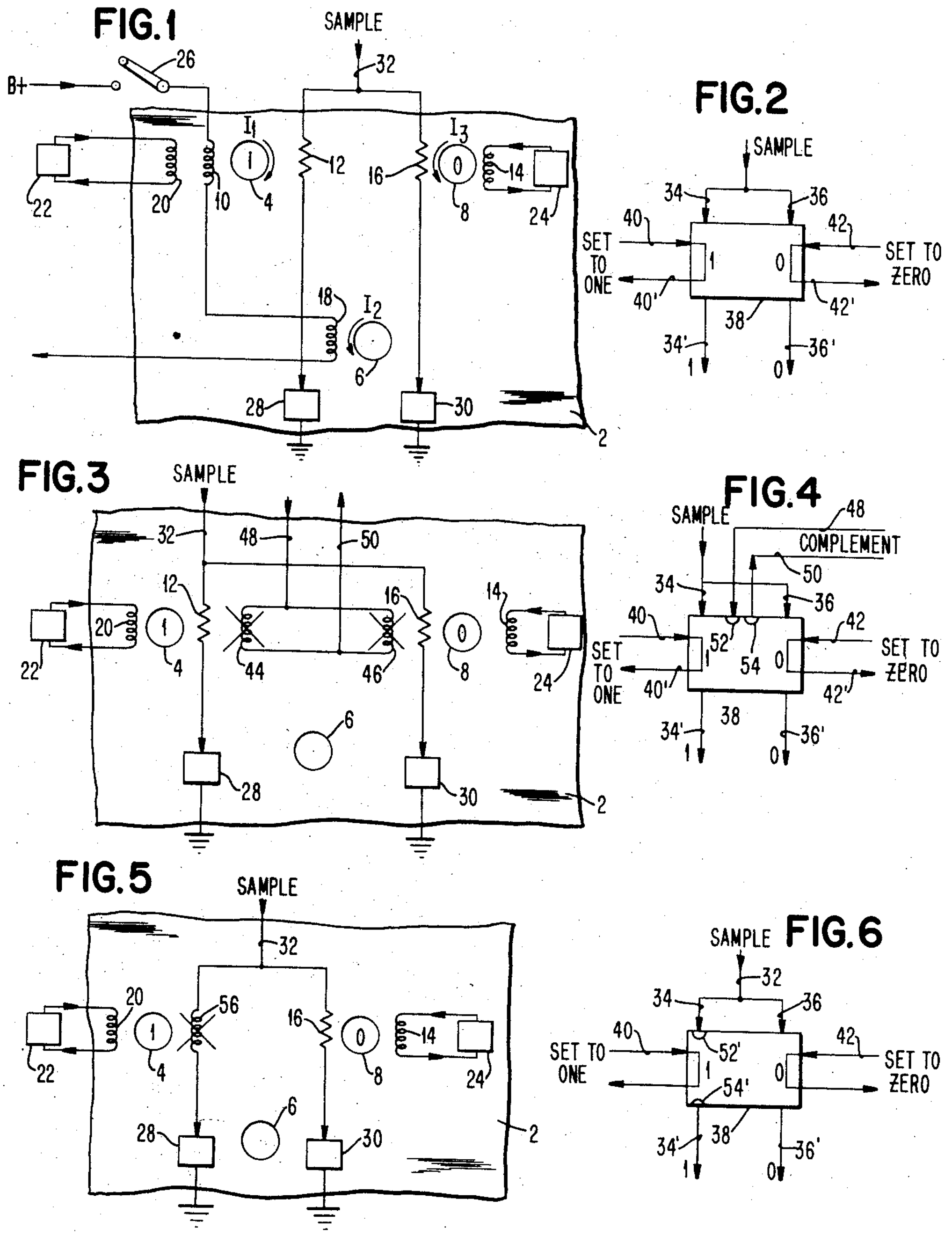
Fig. 1 is an electrical schematic showing of a low temperature flip-flop employed in the adder circuit of this invention and Fig. 2 is a block diagram representation of such flip-flop.
Fig. 3 is the low temperature flip-flop of Fig. 1 modified in a manner that permits successive input signals applied to the same input terminal to successively complement the flip-flop and Fig. 4 is its block diagram representation.
Fig. 5 is an electrical schematic showing of a low temperature flip-flop that always returns to its "0" state after being sensed or sampled and Fig. 6 is its block diagram representation.

If a magnetic field is first made to link two normal resistive areas in a thin superconducting film, and then the magnetomotive force supporting that field is removed, a residual magnetic field will remain linking the two areas so as to sustain a superconductive current flow in the thin film around the two areas. This remanent or "trapped" flux may be used as a memory unit, or the trapped flux can be made to switch back and forth between two such specified locations in response to input signals so as to act as a flip-flop. It has been experimentally observed that if a magnetic field has been trapped linking two holes, or two localized areas containing impurities in a superconducting film, by pulsing a drive coil placed over a third hole or localized area of impurity, the flux linking the first two holes can be made to transfer from one of them to the third hole. The result, after the termination of said driving pulse, is the trapping of flux linking the third hole with one of the original two.

The manner in which the flux is trapped is not clearly understood, as yet, but the manifestations of the phenomenon of trapped flux are sufficient and predictable so as to permit one to utilize such phenomenon in a workable device or system. One theory which has attempted to explain trapped flux is the following. Assume a superconductive film of a few microns thick having two holes therein. A "figure 8" coil is placed over the holes, and is adapted, when carrying current therethrough, to produce a magnetic field that attempts to link said holes. This attempt is initially unsuccessful due to an opposing magnetic field established by circulating currents induced in the superconductive film immediately around said holes, such induced circulating currents being the manner in which flux is prevented from penetrating a superconductive material as described in the above identified texts by Shoenberg and London. So long as the circulating currents flowing in the superconducting film between said holes are less than the critical current capacity of said film, the applied magnetic field is prevented from linking said holes by the opposing magnetic field produced by said circulating currents. However, when the circulating currents exceed the critical current of the superconducting film between the holes, the area between the holes will become resistive, the circulating currents will be dissipated due to the resistance, there will be a minute opposing magnetic field, and the applied field will link the two holes. The heat generated by the transition from the superconductive to the normal resistive state and by the circulating currents flowing through the resistive area for a short time will raise the temperature of the area between the holes to a temperature above the critical temperature of the superconducting film so that the latter will remain in the normal resistive state for a short period of time. If the applied current is maintained during that period, the produced magnetic field will remain linking the two holes. After the generated heat is dissipated by the liquid helium surrounding the superconductor and its associated elements, and the film returns to its superconductive state if the applied current is removed, the magnetic field maintained by applied current will attempt to collapse. However, the attempted collapse of the magnetic field will induce circulating currents around the two holes which will maintain the field, thus "trapping" the field linking the two holes.

Turning to Fig. 1, there is shown a thin metallic film 2 which becomes superconductive when immersed in a bath of liquid helium. Holes 4, 6 and 8 are cut out or masked out of film 2. Coupled to hole 4 is a flat spiral coil 10 which normally is wound concentric to such hole 4 and is placed physically directly above or below it. The drawing shows the spiral core 10 to be displaced laterally of the hole 4, such being done for the purpose of simplifying the showing of the invention. A wire 12 is zig-zagged across hole 4, such wire 12 being a sense wire and is placed over or under the hole 4. In a similar manner, flat spiral coil 14 and zig-zagged wire 16 are disposed about hole 8 in the manner in which coil 10 and wire 12 are disposed about hole 4.

In series with coil 10 is another coil 18, such coil 18 being wound concentric to hole 6 and located either above or below it. Coupled to hole 4 is set coil 20 which is connected to a suitable source 22 of current for applying a current pulse therethrough to transfer flux to hole 4, whereas coil 14 is also connected to a suitable source of current 24 so as to enable coil 14 to be pulsed to transfer flux to hole 8. A switch 26 may be closed at will so as to permit the application of current through coils 10 and 18. Connected to zig-zagged wire 12 is a load device 28 and a corresponding load device 30 is connected to wire 16. Sampling pulses appear at the input terminal 32, and which branch such pulses take down the parallel paths comprising wire 12, load 28 and wire 16, load 30, respectively, will be determined by whether hole 4 or hole 8 has flux trapped therein. Loads 28 and 30 must provide superconductive paths to ground so that only the resistive states of sense wires 12 and 16 will determine which path the sampling pulse takes.

In describing the operation of the flip-flop illustrated in Fig. 1, it is noted that all the coils 10, 14, 18 and 20 are hard superconductors whereas the sense wires 12 and 16 are soft superconductors. As defined for purposes of practicing the present invention, a hard superconductor is one which will remain in the superconducting state when subjected to magnetic fields of the magnitude normally encountered in the device in which such superconductor is employed, whereas a soft superconductor is one which will become resistive when subjected to those same magnetic fields.

The entire device of Fig. 1 is immersed in a bath of liquid helium, though the immersion of the current sources 22, 24 and B+ supply is optional, so that film 2 and all the coils and zig-zag wires are in the superconductive state. Coils 10 and 18 are wound in a manner that they will establish a magnetic field which links them when switch 26 is closed and current is passed through them. This magnetic field links holes 4 and 6 in the manner heretofore described. When switch 26 is opened, the magnetomotive force supporting the magnetic flux is removed, flux will be trapped, linking the two holes 4 and 6. The function of coils 10 and 18 is to initially trap flux between holes 4 and 6 so that the low temperature flip-flop may be started. Thereafter, switch 26 is opened and flux is made to switch from hole 4 to hole 8, with hole 6 acting as a pivot point. The application of a current pulse of sufficient magnitude to coil 14 from current source 24 will cause the film 2 between holes 4 and 8 to go normal. As soon as a normal path is established between holes 4 and 8, the closed lines of magnetic flux linking holes 4 and 6 tend to travel through the normal regions established between holes 4 and 8. When the latter change takes place, complete lines of magnetic flux now link holes 6 and 8, the flux in hole 4 disappears, the normal regions between holes 4 and 8 reverting to their superconductive state in the wake of the magnetic lines of flux as the latter progress toward hole 8. Flux now links holes 6 and 8, and by definition, the flip-flop has switched from its "1" state to its "0" state. Subsequently the application of a sufficient current pulse through winding 20 will cause the flux linking holes 6 and 8 to pivot about hole 6 and link holes 4 and 6 when such current pulse has terminated.

Zig-zag elements 12 and 16 are soft superconductors that are used as sensing elements for determining the state of the low temperature flip-flop just described. Each soft superconductor will be driven resistive by the trapped flux threading the hole associated with it; in other words, upon the state of the flip-flop. When a sample pulse is applied at input lead 32, such pulse will pass through soft superconductor 16 to actuate load 30 when flux is threading holes 4 and 6, and it will pass through soft superconductor 12 to actuate load 28 when flux is threading holes 6 and 8. With loads on the output end of the soft superconductors providing at least one superconducting path to ground, the sample pulse appearing at lead 32 will appear on one of the outputs with no loss of power. The zig-zag configuration of the soft superconductors 12 and 16 is for the purpose of preventing, by creating cancelling magnetic fields, the magnetic field generated by the sample current through such soft superconductors from disturbing the state of the flip-flop. Of course the sampling current is chosen so that it does not exceed the limit of self-current that the soft superconductor can tolerate before being driven resistive. A "1" would represent no trapped flux in hole 8 and a "0" would indicate no trapped flux in hole 4.

One theory for explaining the transfer of trapped flux is as follows: Assume initially that flux is trapped through holes 4 and 6. Such flux is maintained by circulating currents $I_1$ and $I_2$ flowing in the direction of the arrows shown in Fig. 1. Through hole 8, one attempts to force a magnetic field in the same direction as the field in hole 4. Since there can be no net flux change through a superconducting film, circulating current $I_3$ will be generated to keep the net flux linkage through hole 8 to zero. The predetermined distance between holes 4 and 8 can carry a finite amount of current, so when $I_1$ plus $I_3$ exceeds this amount, the area between holes 4 and 8 will go into its normal state. Due to this normal state, the current $I_1$ can no longer flow around hole 4 and thus the flux linking hole 4 no longer has a current to maintain it. The flux linking hole 4 cannot collapse since the area of the film 2 between holes 4 and 6 is in the superconducting state. However, there is a current flowing in coil 14 which will maintain a flux and the area between holes 4 and 8 is in its normal resistive state. The flux linking hole 4 will therefore transfer from hole 4 to hole 8. The net flux through hole 6 during this whole process must remain constant. Thus the field through hole 6, now linked through hole 8, remains constant. The energy taken from the driver 24 was just that amount to move the trapped flux from one hole to the other, plus that energy dissipated in eddy currents.

Fig. 2 is the block diagram representation of the low temperature flip-flop of Fig. 1. The connections to the soft superconductors 12 and 16 are indicated by the vertical lines 34, 34' and 36, 36' respectively, entering and leaving the block near the sides of block 38. The connections to the set coils 20 and 14 are represented by the horizontal lines 40, 40' and 42, 42', respectively, entering and leaving the sides of block 38. It is noted that the representation in Fig. 2 of coils 10 and 18 has been omitted, since such coils are used just to set the flip-flop initially. Where it is desired, there may be more than one sense winding or soft superconductor 12 or 16 associated with a hole if the flip-flop circuit requires more than one output signal to indicate the state of the flip-flop or the process of addition requires such plural sense windings. Similarly, there may be more than one set coil 20 or 14 associated with a hole if desired. A line carrying a sampling pulse passes such pulse through a zig-zag superconductive element such as 12 or 16 so that the state of the flip-flop is not changed by the sampling pulse. But if such sampling pulse is made to pass through a coiled hard superconductor such as coils 10, 14, 18 or 20, then the state of the flip-flop may change if the sampling pulse is of the proper polarity.

Fig. 3 is a circuit diagram of a complementing form of the flip-flop of Fig. 1. A complementing flip-flop is one which changes the state of a flip-flop whenever an input pulse appears at its input terminal. In Fig. 3, as well as in Fig. 5, the coils 10 and 18 for initially trapping flux have been omitted in order to simplify the representation of those embodiments of the invention shown in such figures. Coils 44 and 46 have an X drawn across them to indicate that they are soft spoken superconductors and they provide parallel paths for the complementing input pulse appearing at input lead 48 and exciting through output lead 50. Under steady state conditions of the flip-flop, one of the coils 44 or 46 will be resistive due to presence of trapped flux in its associated hole 4 or 8. When an input pulse appears on lead 48, almost all the current will flow through that coil 44 or 46 which is superconductive. After the flux has been trapped initially by momentarily closing switch 26, the conditions of the two coils 44 and 46 are reversed by such complementing pulses. Subsequent pulses at input lead 48 will complement or cause reversal of state of the flip-flop in the manner described hereinabove.

Fig. 4 is similar to Fig. 2, save that the lines 48 and 50 that are connected to soft superconductors 44 and 46 are indicated by arcs 52 and 54 where such lines 48 and 50 enter and leave block 38 in order to represent a complementing flip-flop.

Fig. 5 is that embodiment of the flip-flop wherein the latter will return to its "1" state after each sampling. This return to "1" after sensing is accomplished by replacing the zig-zag soft superconductor 12 over hole 4 of Figs. 1 and 3 with a soft superconducting coil 56. Thus, when the low temperature flip-flop is in its "1" state, i.e., flux linking holes 4 and 6, the sample pulse will be passed by the soft zig-zag element 16 which is effectively shorting out the now resistive element 56. Such current passing through zig-zag element 16 will not disturb the state of the flip-flop. However, when the flip-flop is in its "0" state, i.e., flux linking holes 6 and 8, the majority of the sampling current will pass through the soft superconducting coil 56 and thus will reset the flip-flop to its "0" state. The inductance of the soft superconductor coil 56 is small compared to the resistance of soft superconductor 16 to assure such reset-to-zero state during continuous sensing, otherwise the L/R time constant could be too long and would prevent the coil 56 from carrying the full driving pulse during the time interval of said pulse.

The block representation in Fig. 6 of the flip-flop of Fig. 5 is similar to that of Fig. 4 save that arcs 52' and 54' show respectively the points of entry and departure of the sampling pulse in block 38 that are connected to soft superconductor 56. By interchanging the soft superconductor coil 56 and soft superconductor zig-zag element 16, the flip-flop of Fig. 5 can be made to end up in its "0" state after every sampling or sensing operation. Likewise, if the soft superconductive zig-zag element 16 over hole 8 in Fig. 5 is also replaced with a soft superconducting coil, the flip-flop could be complemented when it was sampled.

Figures 7, 8:
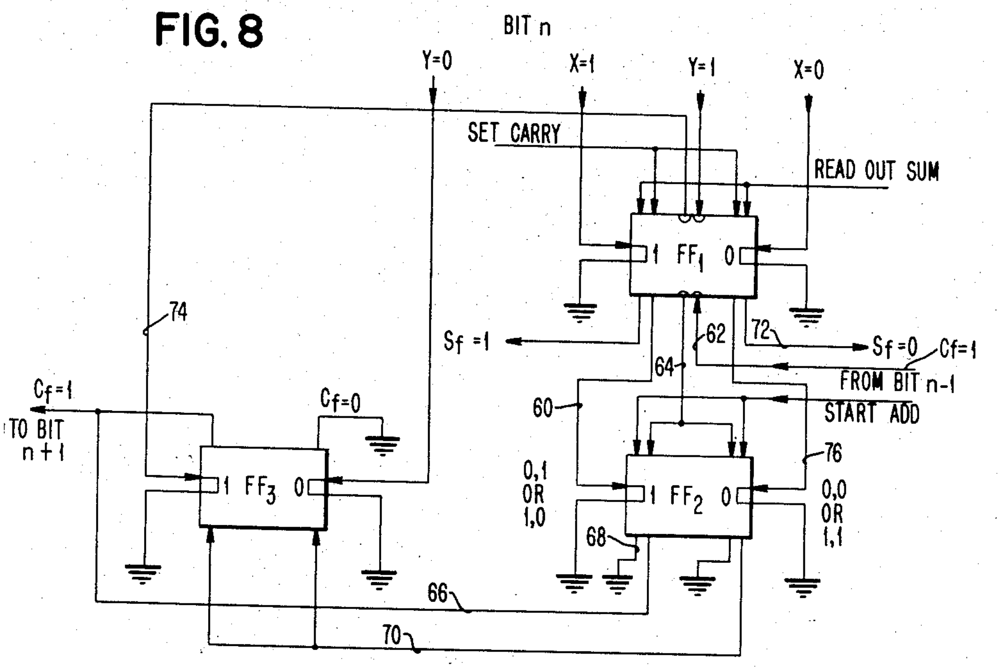
Fig. 7 is a truth table setting forth the logic of a full adder.
Fig. 8 is a block diagram representation of a low temperature adder forming the instant invention, such block diagram incorporating flip-flops of the types shown in the hereinabove Figs. 1, 3 and 5.

The adder circuit of Fig. 8 employs a single flip-flop to generate the half adder sum, and after such half adder sum is obtained, interbit-carry circuits are used to obtain the full adder sum. The principles upon which the low temperature adder circuit of the present device operates are as follows:

Consulting the truth table of Fig. 7, it is seen that the following rules apply:

(1) The sum of two bits can be generated by setting a flip-flop to the value of the addend bit and complementing the flip-flop if the augend bit contains as "1," i.e., if X the addend equals "1," the X flip-flop is set to "1," then whenever the augend, Y, equals "1," the X flip-flop is complemented to produce the $S_h=0$.

(2) If the addend and augend of a bit are both equal to "0," the output carry $C_f$ of that stage is "0," regardless of the value of the input carry $C_i$.

(3) If the addend and augend of a bit are both equal to "1," the output carry $C_f$ of that state is "1," regardless of the value of the input carry $C_i$.

(4) If the augend and addend are not equal, the output carry $C_f$ depends upon the input carry $C_i$, and such output carry $C_f$ equals "1" if input carry $C_i$ equals "1."

(5) If the input carry $C_i$ to a stage is equal to a "0," it has no effect on either the sum $S_f$ or the output carry $C_f$ of that stage. Therefore "0" carries are not propagated.

(6) If the input carry $C_i$ to a stage is equal to "1," the full adder sum $S_f$ is the complement of the half adder sum $S_h$.

Referring to Fig. 8, there is shown a low temperature adder circuit depicted in the symbology employed in Figs. 2, 4 and 6, and particularly Figs. 2 and 4, such adder carrying out the principles set forth in the preceding paragraph. The operation of the adder of Fig. 8 can be understood by following the flow of information from right to left, each line being labeled according to its logical significance. Only an adder for one stage (Bit $n$) is shown, with a carry input $C_i$ entering the adder from a previous stage $n-1$ and a carry output $C_f$ going to a subsequent stage $n+1$.

To begin the adder operation, the addend (X bit) is first read into $FF_1$ through its labeled input circuit. If the $FF_1$ should have been in the same state as that of the addend because of a previous operation then $FF_1$ is unaffected. At a predetermined interval later (usually the time it takes for $FF_1$ to settle down to its new stable state), the augend (Y bit) is read into $FF_1$ and $FF_3$. If the augend bit Y is "0," $FF_1$ is not affected and $FF_3$ is set to its "0" state. If the augend bit Y is equal to "1," $FF_1$ is complemented and $FF_3$ is set to its "1" state. $FF_1$ now contains the sum ($S_h$) of X and Y. At a third time interval, $FF_1$ is sampled by a pulse on the "Set Carry" line, the latter sampling pulse passing through $FF_1$ without changing the state of $FF_1$, but being effective to change $FF_2$ to its "1" state if the sum in $FF_1$ was a "1." It should be remembered, that in accordance with the symbology of Figs. 2 and 4, a sampling pulse passing through the zig-zag soft superconductor element such as 12 or 16

(represented by the symbol

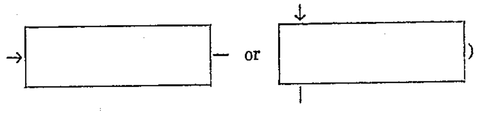

will not change the state of a flip-flop, but a sampling pulse passing through a coil, such as coil 14 or 20, (represented by the symbol

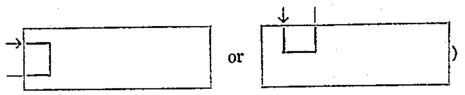

will change the state of a flip-flop if and when the proper coil is actuated.

At a fourth pulse time, the Start Add pulse is simultaneously applied to a $FF_2$ in each stage of the adder. Such Start Add pulse samples $FF_2$ and if $FF_2$ is in its "1" state (indicating that the augend and addend bits are unequal and that the output carry $C_f$ depends upon the input carry $C_i$ as stated in rule 4) the Start Add pulse is returned to ground. If $FF_2$ is in its "0" state (indicating that the augend and addend bits are equal and that the output carry $C_f$ is independent of the input carry $C_i$ as stated in rules 2 and 3) the Start Add pulse is transmitted to $FF_3$. Said transmitted pulse samples $FF_3$ to determine the output Carry $C_f$.

From the truth table, Fig. 7, it can be seen that the value of the output carry $C_f$ depends upon the state of the equality of the addend and the augend. That is the output carry $C_f$ is "1" if both the addend and the augend are equal to "1," and "0" if they are both equal to "0." The obtaining of a pulse on line 70 as a result of sampling $FF_2$ by the Start Add pulse merely proves the equality but does not establish the state of the equality. By using the pulse on line 70 to sample $FF_3$, the state of the equality can be determined. For example, if $FF_3$ is in its "1" state, in other words, Y the augend equals "1"; and since the appearance of a pulse in line 70 indicates equality of the addend and augend bits, ergo, X the addend must also equal "1." Applying rule 3, the output carry $C_f$ then equals "1." Thus there will be an output carry $C_f$ to the next stage and the pulse on line 70 is transferred to a $FF_1$ of the next stage through the "1" side of $FF_3$.

To summarize the function of the Start Add pulse, the latter will cause the generation of an output carry $C_f$ to a subsequent stage from a given stage if such an output carry is independent of an input carry $C_i$ to such given stage. Such Start Add pulse will be returned to ground and will be ineffective if the output carry $C_f$ of a given stage is dependent upon the input carry $C_i$ to said given stage.

Referring to rule 5, "0" carries are not propagated throughout the adder. Therefore, these will never be an input to a stage in the adder indicating that $C_i$ equals "0." However, there may be an input indicating that $C_i$ equals "1." Such a $C_i$ equals "1" input pulse will always complement the $FF_1$ of its corresponding stage to generate $S_f$ (rule 6). If the Start Add pulse had previously generated an output carry $C_f$ as described hereinabove, said input carry pulse $C_i$ equals 1 would be returned to ground through $FF_2$ and thus produce no further effect. However if the same Start Add pulse had previously been returned to ground so as to be ineffective, said input carry pulse $C_i$ equals 1 will become an output carry pulse $C_f$ equals 1.

Two examples of the application of binary addition will be given to illustrate the invention. Assume that $X=1$, $Y=0$ and $C_i=1$. At time $T_1$, a pulse appears on the $X=1$ line to set $FF_1$ to its "1" state and a pulse appears at time $T_2$ on the $Y=0$ line to set $FF_3$ to its "0" state. At time $T_3$, a Set Carry pulse appears on the line so labeled in Fig. 8 to sample $FF_1$. Since $FF_1$ is in its "1" state, the Set Carry sampling pulse goes through $FF_1$ through line 60 to set $FF_2$ to its "1" state. At time $T_4$, a pulse appears along the Start Add line to sample $FF_2$, and since the latter is in its "1" state, the Start Add pulse is grounded through line 68. At a slightly later time than $T_4$, the carry pulse $C_i=1$ appears on the $C_i=1$ line 62 (there is no $C_i=0$ line in the instant adder). Said $C_i=1$ pulse has been generated as a result of the application of a Start Add pulse to a lower order stage of the adder. The Start Add pulse having been applied to said other stage at the same instant of time that the Start Add pulse was applied to the given stage, i.e. at time $T_4$, said $C_i=1$ pulse complements $FF_1$ along line 62 and samples $FF_2$ along line 64. At time $T_5$, the Read Out Sum line is actuated to find $FF_1$ in its "0" state and the sum $S_f$="0" is read out along line 72. The results obtained are $S_f=0$ and $C_f=1$ which is the correct addition for $X=1$, $Y=0$ and $C_i=1$.

It is to be noted that the logic employed in this instant adder insures proper operation by only one output carry pulse $C_f=1$ being generated by a given stage during an addition process. This is accomplished by not permitting both an input carry $C_i=1$ and a Start Add pulse to generate an output carry $C_f=1$ during an addition process. It is to be further noted that situations will arise where the output carry of each stage depends on the input carry to that stage. In that case all Start Add pulses except the one applied to the least most significant bit will be returned to ground and will have no effect. The Start Add pulse applied to the least most significant stage of the adder will cause the generation of an output carry pulse. Said output carry pulse will become the input carry pulse to its nearest neighboring stage and in turn will cause the generation of an output carry pulse from that stage and so on throughout the entire adder. In other words the Start Add pulse applied to the least most significant stage of the adder must ripple through the entire adder. Therefore there must be a sufficient interval between time $T_4$ when the Start Add pulse is applied and time $T_5$ when the sum is read out to allow such carry pulses to be propagated throughout all the stages.

In performing the addition of $X=1$, $Y=1$ and $C_i=1$, at time $T_1$, $FF_1$ is set to its "1" state by an input pulse appearing at the $X=1$ input line. At time $T_2$, a pulse appears at the $Y=1$ line which complements $FF_1$ to its "0" state and also sets $FF_3$ to its "1" state through line 74. Thus $FF_1$ now houses the sum $S_h$ of $X=1$ and $Y=1$. At time $T_3$, the set carry pulse is applied to sample $FF_1$, such sampling pulse passing through the "0" side of $FF_1$ to set $FF_2$ to its "0" state through line 76. At time $T_4$, the Start Add pulse is applied on the line so labeled, such pulse finding $FF_2$ in its "0" state so the pulse is transmitted along line 70 to pass through $FF_3$ (which was previously set to its "1" state by a pulse appearing at the $Y=1$ line) and produce the output carry $C_f$ to the next stage of the adder. At a time slightly greater than time $T_3$ the $C_i=1$ line is active to complement $FF_1$ to its "1" state as well as to sample $FF_2$, such sampling current pulse passing through the line 64 and through the "0" side of $FF_2$ to ground. The signal appearing at time $T_5$ on the Read Out Sum line will sample the Sum flip-flop $FF_1$ and produce a sum output on line $S_f=1$. The results show $S_f=1$ and $C_f=1$ which are correct for the addition of $X=1$, $Y=1$ and $C_i=1$.

It is noted that in Figures 1, 3 and 5 of the drawings that when the superconductive flip-flop of this invention is set to its "1" state, namely, trapped flux linking holes 4 and 6, the sampling pulse will appear at load 30. Similarly, when the superconductive flip-flop is in its "0" state, the sampling pulse will appear at load 28. However, the block diagrams of Figures 2, 4, 6 and 8 are represented with the output load on the same side of a block 38 as the binary state of the flip-flop. Such representation is for ease of understanding the logic and is not meant to conform to the physical structure of the superconductive flip-flops shown in Figures 1, 3 and 5.

The present full adder requires relatively few components, namely, only three flip-flops and two sampling circuits for each $FF_1$ and $FF_2$, although it is admittedly slowed down by the five pulse periods required to carry out the addition process. Nevertheless a low temperature full adder is obtained that is exceedingly small, relies upon very stable components so that repair and maintenance are kept to a minimum, and can be of considerable value, where very high speeds of operation are not required, in providing a component that can materially reduce the over-all size of a computer. The relative dimensions of the superconductive film 2, apertures 4, 6 and 8, coils 10, 14, 18, and 20, as well as zig-zag elements 12 and 16 are described in an article entitled "Trapped-Flux Superconducting Memory" by J. W. Crowe appearing in vol. 1, No. 4, of the October 1957 issue of the "IBM Journal of Research and Development," pages 295–303.

I claim:

1. A binary adder including a plurality of adder stages wherein one stage comprises a first flip-flop, a second flip-flop, and a third flip-flop, means for storing the augend bit at a first time period in the first flip-flop, means for storing at a second time period the addend bit in said third flip-flop if said addend bit is a "0" but to complement said first flip-flop and set said third flip-flop to its "1" state if said addend bit is a "1," means for sampling at a third time period the state of said first flip-flop so as to set said second flip-flop in the same state as said sampled first flip-flop, means for utilizing at a fourth time period the "carry" output of a previous stage of said adder to complement said first flip-flop as well as to sample the state of said second flip-flop, such sampled second flip-flop producing a "carry" signal to the next higher stage if said second flip-flop was in its "1" state, and means for simultaneously sampling at a fifth time period the second and third flip-flops so as to produce an output "carry" signal to the next higher stage if said third flip-flop was in its "1" state.

2. A binary full adder including a plurality of adder stages wherein one stage comprises a first flip-flop, a second flip-flop, and a third flip-flop, means for storing the addend bit at a first time period in said first flip-flop, means for storing at a second time period the augend bit in said third flip-flop if said augend bit is a "0" but to complement said first flip-flop and set said third flip-flop to its first state if said augend bit as a "1," means for sampling at a third time period the state of said first flip-flop so as to set said second flip-flop in the same state as said sampled first flip-flop, means for utilizing at a fourth time period the "carry" output of a previous stage of said adder to complement said first flip-flop as well as to sample the state of said second flip-flop such sampled second flip-flop producing a "carry" signal to the next higher order stage if said second flip-flop was in its "1," state, and means for simultaneously sampling at a fifth time period the second and third flip-flops so as to produce an output "carry" signal to the next higher stage if said third flip-flop was in its "1" state.

3. A binary adder as defined in claim 1 wherein means are provided at a sixth time period to sample the binary state of said first flip-flop so as to determine the "sum" of said stage.

4. A binary adder as defined in claim 1 wherein said flip-flops are composed of superconductive elements.

5. A binary adder as defined in claim 1 wherein said first flip-flop stores the "sum" and comprises a superconductive film having at least two apertures therein, a first means for trapping flux in one of said apertures to indicate the storage of a "1" and a second means for trapping flux in a second aperture to indicate the storage of a "0," two separate sensing circuits for sensing the storage state of said first flip-flop wherein each sensing circuit includes a two-branched parallel superconductive path having a zig-zag superconductive element in each branch of such parallel path and wherein such superconductive element is coupled to an aperture, said superconductive element becoming normal resistive whenever its associated aperture has trapped flux therein, and two separate complementing circuits for changing the state of said flip-flop wherein each complementing circuit is a two-branched parallel circuit comprising a coiled superconductor element coupled to an aperture.

6. The adder as defined in claim 5 wherein the superconductive element in each sensing circuit associated with the second flip-flop is zig-zagged so that such zig-zagged superconductive element creates substantially negligible magnetic field when a sensing current pulse passes therethrough.

7. The adder as defined in claim 6 wherein the superconductive element in each sensing circuit associated with the second flip-flop is zig-zagged so that such zig-zagged superconductive element creates a substantially negligible magnetic field when a sensing current passes therethrough.

8. A binary adder as defined in claim 1 wherein said second flip-flop comprises a superconductive film having at least two apertures therein, a first means for trapping flux in one of said apertures to indicate the storage of a "1" and a second means for trapping flux in a second aperture to indicate the storage of a "0," and two separate sensing circuits for sensing the storage state of said second flip-flop wherein each sensing circuit includes a two-branched parallel superconductive path having a superconductive element in each branch, each such superconductive element being coupled to an aperture and becoming normal resistive whenever its coupled aperture has trapped flux therein.

9. A binary adder as defined in claim 1 wherein said third flip-flop comprises a superconductive film having at least two apertures therein, a first means for trapping flux in one of said apertures to indicate the storage of a "1" and a second means for trapping flux in a second aperture to indicate the storage of a "0," and a sensing circuit for sensing the storage state of said second flip-flop comprising a two-branched parallel superconductive path having a superconductive element in each branch, each such superconductive element being coupled respectively to said first aperture and said second aperture and becoming normal resistive whenever its coupled aperture has trapped flux therein.

No references cited.

UNITED STATES PATENT OFFICE

CERTIFICATE OF CORRECTION

Patent No. 2,888,201 May 26, 1959

Bennett Housman

It is hereby certified that error appears in the printed specification of the above numbered patent requiring correction and that the said Letters Patent should read as corrected below.

Column 5, line 46, after "soft" strike out "spoken"; column 6, lines 3 and 4, for "to its "0" state" read -- to its "1" state --; line 32, for "contains as" read -- contains a --; line 40, for "state is" read -- stage is --; column 8, line 61, for "time $T_3$" read -- time $T_4$ --; column 9, line 55, for "bit as a" read -- bit is a --.

Signed and sealed this 17th day of November 1959.

(SEAL)
Attest:

KARL H. AXLINE
Attesting Officer

ROBERT C. WATSON
Commissioner of Patents